United States Patent Office 3,514,500
Patented May 26, 1970

---

3,514,500
POLYMER DISPERSIONS AND DISPERSANTS
Desmond Wilfrid John Osmond, Iver Heath, and Frederick Andrew Waite and Derek John Walbridge, Slough, England, assignors to Imperial Chemical Industries Limited, London, England, a corporation of Great Britain
No Drawing. Filed July 30, 1965, Ser. No. 476,201
Claims priority, application Great Britain, Aug. 4, 1964, 31,600/64
Int. Cl. C08f 41/20
U.S. Cl. 260—874     5 Claims

---

ABSTRACT OF THE DISCLOSURE

The present invention provides a polymeric substances as stabilizers for dispersions of polymers in organic liquids comprising a polymeric backbone and attached thereto at least five side chains of different polarity to the backbone, the molecular weight of the side chains being at least 500 and the weight ratio of the attached side chains to be backbone being from 0.5:1 to 5:1, respectively. The polymeric substance is formed by copolymerizing in solution in an organic solvent an ethylenically unsaturated monomer, which provides the backbone, and a chain-like macro-monomer of molecular weight at least 500 having only one terminal ethylenically unsaturated group per molecule, the macromonomer being of different polarity to the resulting backbone and the weight ratio of the backbone to the total number of solvatable chains attached thereto, which number is at least five, being from 1:0.5 to 1:5.

---

This invention relates to polymeric substances suitable for use as stabilisers in dispersions of particles in liquids, particularly in dispersions of polymer inorganic liquids.

It has been proposed to stabilise a dispersion of a polymer in an organic liquid in which it is insoluble by polymerising monomer to form the insoluble polymer in the liquid in the presence in the liquid of a polymeric stabiliser which is a block or graft containing two types of polymeric component, one type being solvated by the liquid and another type of different polarity being relatively non-solvated and associated with the disperse polymer particles. As the polymerisation proceeds, the monomer, which is soluble in the organic liquid, is converted to polymer which is insoluble in the organic liquid and forms disperse particles. The non-solvated polymeric component, which may conveniently be termed the "anchor" component of the stabiliser becomes associated with the surface of the disperse particles of non-solvated polymer and thereby provides around the particles a stabilising layer of the solvated component.

The present invention provides polymeric substances comprising a polymeric backbone and attached thereto at least five side chains of different polarity to the backbone, the molecular weight of the side chains being at least 500 and the weight ratio of the attached side chains to the backbone being from 0.5:1 to 5:1 respectively.

Preferably, the weight ratio of the attached side chains to the backbone is from 0.5:1 to 2:1. Where the weight ratio is higher, i.e. from 2:1 to 5:1, the molecular weight of the side chains is preferably not greater than 2500.

Any number of side chains above the stated minimum may be attached to the backbone, the upper limit being a practical one set by the necessity for having a backbone length appropriate to the total mass of the side chains. Preferably the number of side chains on the backbone is from 8–15.

The side chains may be attached to the backbone by a condensation reaction between side chains containing only one reactive group per molecule and a backbone containing at least five complementary reactive groups per molecule. Typical condensation reactions give rise to the following links between the two components:

(i) Ester links, especially when formed by ester-interchange or by a reaction such as carboxyl/glycidyl or hydroxyl/acid chloride or hydroxyl/acid anhydride.
(ii) Ether links, especially when formed by addition reactions between alkylene oxides and hydroxyl.
(iii) Amide links, especially when formed by amine/acid chloride reaction.
(iv) Urethane links, especially when formed by reaction of isocyanate with hydroxyl groups.

In order to avoid the possibility of crosslinking the solvatable component should be substantially mono-functional in such reactions, and preferably the functional group should be at one end of the component.

The side chains may be mono-functional polymeric materials of molecular weight 5000–50,000 but this condensation method is more conveniently applied to the attachment of side chains of lower molecular weight in the range 500–5000. In the condensation method the backbone is an addition-type random copolymer in which one of the monomers contains the complementary reactive group and is used in a minor proportion sufficient to provide the required number of these groups per backbone molecule.

Preferably, however, the polymeric substance is formed by copolymerising in solution in an organic solvent an ethylenically unsaturated monomer, which provides the backbone, and a chain-like macro-monomer of molecular weight at least 500 having only one terminal ethylenically unsaturated group per molecule, the macro-monomer being of different polarity to the resulting backbone and the weight ratio of the backbone to the total number of solvatable chains attached thereto, which number is at least five, being from 1:0.5 to 1:5.

A particular advantage of making the polymeric substance by copolymerization of macro-monomer and another monomer is that by aiming to attach on average at least five side chains to each backbone, substantially each backbone is provided with at least one side chain and so, in the reaction product, there is substantially no unmodified backbone component. At the same time, because of the selected mass balance of the reactants, the proportion of the macro-monomer molecules of the other monomer molecules is so low that substantially all the macro-monomer is copolymerised and the reaction product is substantially free of homo-polymerized mono-functional polymer. The average number of side chains attached to the backbone can be controlled by varying the ratio of monomer to macro-monomer and the molecular weight of the backbone.

When the polymeric substance is to be used as a stabilizer this substantial freedom from unmodified backbone, macro-monomer and homo-polymerised macro-monomer, is an important advantage since from the stabilisation point of view these materials would merely be contaminants. In use as a stabiliser for particles dispersed in a liquid the side chains of the polymeric substance are solvated by the liquid of the dispersion, the polymeric backbone being relatively non-solvated and so associated with the disperse particles. Where, therefore, the substance is to be used to stabilise a dispersion of particles in a non-polar organic liquid, the side chains should be non-polar in character so that they are solvatable by the organic liquid and the backbone should be polar. Conversely, where the dispersion is in a polar liquid, the side chains should be polar and the backbone non-polar. The precise nature of the suitably solvatable side chains will, therefore, depend to a large extent on the precise nature of the liquid of the dispersion in which the substance is to be used as a stabiliser. A simple test of solvatability by any particular liquid is that the side chain by itself before attachment to the backbone should be completely soluble in that liquid.

Where the liquid is mainly aliphatic hydrocarbon in nature, e.g. pentane, hexane, heptane or octane, the following are examples of suitable side chains which would be solvated by the liquid:

Polymers of long chain esters of acrylic or methacrylic acid, e.g. stearyl, lauryl, octyl, 2-ethyl hexyl and hexyl esters of acrylic or methacrylic acid;
Polymeric vinyl esters of long chain acids, e.g. vinyl stearate;
Polymeric vinyl alkyl ethers;
Polymers of ethylene, propylene, butadiene and isoprene;
Long chain fatty acids and polymers of hydroxyl-containing long chain fatty acids.

Where the liquid is mainly aromatic hydrocarbon in nature, e.g. xylene and xylene mixtures, benzene, toluene and other alkyl benzenes and solvent naphthas, similar side chains may be used and, in addition, shorter chain analogues, e.g. polymers of ethoxy ethyl methacrylate, methyl methacrylate, and ethyl acrylate or ethyl celluloses. Other side chains suitable for use in this type of liquid include aromatic polyethers and polycarbonates and polymers of styrene and vinyl toluene.

Where the liquid is weakly polar in nature, e.g. a higher alcohol, ketone or ester, suitable solvatable components include:

Aliphatic polyethers;
Polyesters of short chain acids and alcohols;
Polymers of acrylic or methacrylic esters of short chain alcohols; and
Polymers of hydroxyl-containing short chain acids.

Where the liquid is strongly polar in nature, e.g. methyl or ethyl alcohol or water, suitable solvatable chains include polymers of acrylic or methacrylic acid, ethylene oxide or vinyl pyrrolidone, and hydroxylated polymers, e.g. polyvinyl alcohol or polymers of glycol mono-methacrylates.

Solvatable chains of low molecular weight and containing a group reactable in condensation reactions may be made by condensation reactions producing a polyester or polyether. Preferably the polyester reaction is a simple one between a mono-hydroxylic mono-carboxylic monomer, such reactions leading to claims which are strictly mono-functional with respect to one group. The most convenient monomers to use are hydroxy acids, particularly α,ω- or approximately α,ω-acids. For example, a hydroxy fatty acid such as 12-OH stearic acid may be polymerised to form a non-polar chain solvatable by such organic liquids as aliphatic and aromatic hydrocarbons and long chain ketones. Similarly a hydroxy acid such as lactic or glycollic acid may be polymerised to form a polar chain solvatable by esters and short-chain ketones. Some naturally-occurring compounds also contain solvatable chains useful in the substances of this invention. For example, non-polar long chain polyesters of hydroxy fatty acids are found in some natural waxes such as carnauba.

Polyethers containing a reactive group may also be made by a variety of condensation reactions. For example, propylene oxide may be condensed to form a chain containing a hydroxyl group and solvatable by ketones and ethylene oxide may be condensed to form a similar component solvatable by highly polar liquids.

Solvatable chains of suitable molecular weight may also be made by condensation or addition reactions involving a telomer which not only controls the molecular weight of the polymer but also provides the reactive group used in the subsequent condensation reaction. For example, suitable short non-polar chains of monomers such as lauryl or stearyl methacrylate or octadecane may be made in this way by polymerisation in chlorinated hydrocarbon followed by hydrolysis to produce terminal reactive groups. Polar chains may be made using methyl methacrylate or vinyl pyrrolidone in similar manner.

Where the side chain is an addition polymer, suitable polymers containing a terminal reactive group may be made, for example, by polymerising ethyleniclly unsaturated monomer in the presence of an initiator and a chain transfer agent, both of which contain the group reactible in a condensation reaction. Such processes are described in our patent application No. 367,883.

Ionic polymerisation reactions may also be used to form the solvatable component. For example, non-polar hydrocarbon polymers can be formed in this way, and the reactive group therein may be provided by termination using carbon dioxide which provides a carboxyl group, or water or oxygen, which produce a hydroxyl group.

The above-mentioned side chains containing a reactive group may be converted to macro-monomers for use in the preferred copolymerisation process of making the substances of this invention by reacting the reactive group with a compound containing a complementary reactive group and an unsaturated copolymerisable group. Suitable reactions for attaching an unsaturated group in this way include the condensation reactions mentioned above. For example, suitable compounds are:

| Compound | For reaction with chain containing— |
|---|---|
| (i) Glycidyl (meth)acrylate, alkylamino alkyl (meth)acrylate, vinyl ester interchange, allyl alcohol. | —COOH |
| (ii) Allylamine, hydroxyethyl or -propyl methacrylate. | —COCl |
| (iii) (Meth)acrylyl chloride, vinyl isocyanate, ester interchange with (meth)acrylate. | —OH |
| (iv) (Meth)acrylyl chloride, (meth)acrylic acid, vinyl isocyanate, esters of (meth)acrylic acid. | —NHR (R=H or lower alkyl) |

The backbone of the polymeric substances of this invention must be of different polarity to that of the side chains so that it is non-solvated by the liquid of the dispersion in which it may be used as a stabiliser. A simple test of non-solvatability by any particular liquid is that the backbone itself without attached side chains should be insoluble in the liquid. It will be understood, of course, that in liquids in which the substance is to be used as a stabiliser, the substance as a whole should not be so insoluble in the liquid that it is thrown out as a granular precipitate. For example, as a backbone, a methyl methacrylate polymer would be suitable in an aliphatic hydrocarbon liquid, a polyacrylonitrile polymer in an aromatic hydrocarbon liquid and a polystyrene in a polar organic liquid.

These three polymers are merely illustrative of a range of backbones extending from polar to non-polar polymer. Other typical polymers include polymers of acrylic and methacrylic acids, esters, nitriles and amides of such acids, vinyl alcohol and derivatives such as chloride, acetate, chloracetate and stearate, vinylidene chloride, styrene and derivatives such as vinyl toluene, α-methyl styrene and divinyl benzene, butadiene and others. The polymer may be the product of a mixture of monomers, for example, methyl methacrylate with a minor proportion of methacrylic acid or glycidyl methacrylate, or styrene with a minor proportion of allyl glycidyl ether, allyl alcohol or an ester thereof.

Broadly there are three types of systems, (1) where the polymer is non-solvated because it is polar relative to the liquid, (2) where the polymer is non-solvated because it is non-polar relative to the liquid, (3) where the polymer is non-solvated by all common liquids because of its molecular structure and irrespective of any question of relative polarity.

Systems typical of the first case are those in which the liquid is of a non-polar organic nature, the most common liquids of this type being aliphatic hydrocarbons, such as white spirit (an aliphatic/aromatic hydrocarbon), and isooctane. With slightly more polar organic liquids, such as aromatic hydrocarbons, fatty esters and fatty ketones, very highly polar polymers may be used. The organic liquid may, of course, be a mixture.

Suitable polar polymers for use in systems of the first type include esters of unsaturated acids with lower alcohol, e.g. acrylic, methacrylic and ethacrylic acid esters of methyl, ethyl and butyl alcohol. In homopolymers of such esters, butyl alcohol is the highest alcohol which can be used and preferably this ester is used as a co-monomer with a more polar monomer. This will usually be the case where the substance of this invention is made by the condensation reaction between backbone and side chains since, as described above, the backbone polymer must then contain reactive groups provided by a minor co-monomer and these are usually more polar in nature. Higher alcohols, e.g. octyl and lauryl, can be used provided the polymers also contain an additional polar group to compensate for the longer non-polar carbon-carbon chains. For example, the esters may be copolymerised with a minor proportion of a highly polar monomer such as acrylic or methacrylic acid. Mono-esters of glycols having a free hydroxyl group may be used, the hydroxyl group providing an additional polar effect. These carboxyl and hydroxyl groups may be used, if desired to link the side chains to the preformed backbone polymer by the condensation reaction. Alternatively, the free hydroxyl group may be esterified with a polar acid such as acetic or formic or it may be etherified with a polar alcohol such as methanol, as illustrated by, e.g. β-ethoxy ethyl methacrylate. A similar result may be achieved using as the alcohol partial esters of glycerol or its derivatives.

A further alternative is to have present in the alcohol an amino group as, for example, in methanolamines and ethanolamines, an oxane ring as in glycidyl compounds, or a free carboxylic group as in a hydroxy acid such as citric acid.

Esters of these hydroxyl-containing materials with other unsaturated acids such as maleic, fumaric and itaconic, may be used, but since such esters are difficult to homo-polymerise they are best used in conjunction with a major proportion of another suitably polar monomer.

In general, it is possible to incorporated in the polymer to be dispersed a minor proportion of a co-monomer which by itself would not produce a sufficiently polar polymer.

A similar type of polar polymer is produced from a monomeric ester or ether of an unsaturated lower alcohol such as vinyl alcohol.

The esters may be of hydrofluoric acid and lower acids such as acetic, chloracetic, propionic and formic. Where higher acids are used then they should also contain an additional polar group to produce a sufficiently polar polymer, for example, the acid may be a dicarboxylic acid, such as oxalic, in which the second carboxylic group is left free or is esterified with a lower alcohol such as methyl or ethyl alcohol. Alternatively, the acid may contain a hydroxyl group, e.g. latic or citric acid, the hydroxyl group being left free or reacted, e.g. acetylated. Or the acid may contain an amino group, e.g. glycollic acid may be used, the amino group providing the additional polarity required.

Similar principles are applicable to ethers of unsaturated lower alcohols. The ether may be a simple ether of a lower alcohol such as methyl or ethyl alcohol. Alternatively, polarity may be maintained by using an ether of a di- or tri-hydroxy alcohol of which a hydroxyl group is left free, or is esterified with a lower acid such as acetic or formic or is etherified with methanol. Alternatively, the ether may be of a dimethyl ethanolamine or diethyl ethanolamine or of a glycidyl compound.

Another type of polar polymer is produced by polymerising an acid, such as acrylic or methacrylic. Alternatively, polar derivatives such as acid chlorides, amides, methylolamides, may be polymerised. Such monomers give particularly non-solvatable polymers and are suitable for copolymerising with monomers which, by themselves, would not produce a satisfactorily non-solvatable polymer.

In the second type of system, the liquid of the dispersion is polar, e.g. methanol, ethanol, water, acetone, glycol and, in extreme cases, dimethyl formamide and methyl formate. Such polar organic liquids may contain a proportion of water. In this type of system the non-solvated polymer backbone is relatively non-polar. Polymers of hydrocarbons such as styrene, vinyl toluene, vinyl benzene, diisopropenyl benzene, isoprene, butadiene, isobutylene and ethylene, are suitably non-polar.

Other non-polar polymers are those of higher fatty esters of unsaturated acids such as acrylic, methacrylic and ethacrylic acids. In these cases, the alcohol component of the ester contains a long carbon-carbon chain to produce a polymer of suitable non-polarity. Cetyl alcohol is a typical alcohol. Lauryl alcohol is about the lowest alcohol which can be used in homopolymer esters and preferably esters of this alcohol are used as co-monomers with more non-polar monomer. In addition, one can use partial long-chain esters of a polyol, e.g. glyceryl distearate, dilaurate or di-behenate, the remaining hydroxyl of the glycerol being esterified with the unsaturated acid.

Alternatively, one can use in this second type of system higher fatty esters or ethers of unsaturated alcohols such as vinyl and allyl alcohol. Suitable acid components of such esters are stearic acid, behenic acid and mono-esters of dibasic acids such as cetyl or lauryl adipate or sebacate.

Suitable ethers are those of cetyl alcohol or of glycerol distearate, dilaurate or dibehenate.

In general, in this second type of system the polymer is non-solvated by reason of it containing long carbon-carbon chains.

In the third type of system, the organic liquid may be of any polarity, e.g. aliphatic hydrocarbon, benzene or ethyl acetate. In this case, the polymer is non-solvated irrespective of its relative polarity. Such polymers include, for example, those of vinyl chloride, vinylidene chloride and acrylonitrile.

Again, in these second and third types of systems any reactive groups necessary for attachment of the side chains by a condensation reaction may be introduced by using a minor proportion of a co-monomer containing such a group. Where the attachment is by the preferred copolymerisation method then, of course, the macromonomer is copolymerised with monomers which will form a suitable backbone selected according to the principles outlined above.

When the substance is to be used for stabilising dispersions of polymer particles and the polymer dispersions are to be used in coating compositions, the polymer backbone of the susbtance should be compatible in the final coating film with the originally dispersed polymer. To achieve this it is preferred that the backbone and the disperse polymer be derived from the same or similar monomers. In any case, the principles laid down above for relating backbone polymer to liquid may also be applied to selection of a suitable non-solvent liquid in which to disperse the polymer.

Polymeric substances of this invention are particularly useful, when suitably selected, as stabilisers for use in dispersion polymerisation, i.e. in processes of producing dispersions of polymers in organic liquids by polymerising monomer in the liquid to form disperse particles of polymer which are stabilised by also having present in the liquid a substance comprising a chain-like component solvated by the liquid and a non-solvated component which serves to anchor the solvated component to the surface of the disperse particles. Polymeric substances of this invention suitable for use as stabilicers in such processes are those which comprise side chains which are solvated by the liquid and a backbone which is non-solvated by the liquid and which are soluble or dispersible in the liquid.

Polymeric substances of this invention may also be used for stabilising dispersions of other types of particles, e.g. pigments, metallic powders, pesticides, blowing agents, etc. in appropriate liquids.

The invention is further illustrated by the following specific examples in which parts are by weight.

EXAMPLE 1

500 parts of a dimer of 12-OH stearic acid having a molecular weight of about 560 were reacted with 143 parts of glycidyl methacrylate by refluxing in solution in an aliphatic hydrocarbon boiling in the range 100–120° C. and containing 3 parts of hydroquinone, in the presence of a tertiary base catalyst. When esterification was substantialy complete, the methacrylate groups attached to the dimer were copolymerised with 700 parts of methyl methacrylate by refluxing in aromatic hydrocarbon, petroleum ether of boiling point 60° C. being added to reduce the reflux temperature to about 80° C. Benzoyl peroxide was used as catalyst and the molecular weight of the copolymer was restricted to about 15,000 (weight average) by addition of primary octyl mercaptan as a 10% solution in white spirit. The resulting copolymer contained on average 10 dimeric acid units per molecule.

A mixture of 600 parts low boiling petroleum 60–80° C., 300 parts white spirit, 2 parts azodiisobutyronitrile initiator and 6 parts of a 10% solution of primary octyl mercaptan in white spirit was heated to reflux and to it was added over a period of three hours a mixture of 40 parts of a 50% solution (by weight) of the polymeric substance prepared as described above, 980 parts of methyl methacrylate, 20 parts of methacrylic acid, 2 parts of azodiisobutyronitrile initiator and 20 parts of a 10% solution of primary octyl mercaptan in white spirit. The product was a very fine dispersion of polymer containing about 50% solids stabilised by the polymeric substance. In this dispersion the dimeric acid component of the polymeric substance being non-polar was solvated by the substantially non-polar liquid hydrocarbon and the polymethacrylic component, being of different polarity was relatively non-solvated and was associated with the disperse particles of like polar polymer.

EXAMPLE 2

A mixture of 540 parts of commercial 12-hydroxystearic acid and 60 parts of xylene was heated to reflux under an atmosphere of nitrogen and water removed by azeotrope distillation, keeping the reaction temperature below 200° C., until the theoretical volume of water for complete reaction had been removed. The non-volatile content of the solution was 88–90% and the solid polyester had an acid value 34–35 mgms. KOH/gm., a hydroxyl value of 14 mgm. KOH/gm., and a number average molecular weight as determined by end group analysis of 1500–1600.

565 parts of the poly-12-hydroxystearic acid solution were diluted with 435 parts of xylene and refluxed with 64.5 parts of glycidyl methacrylate in the presence of 0.5 part of hydroquinone and 1 part of N,N'-dimethyl dodecyl amine. The esterification was continued until the acid value approximated to zero. The non-volatile content of the solution of complex methacrylate macro-monomer was 50%.

A mixture of 500 parts of this solution, 245 parts of methyl methacrylate, 5 parts of methacrylic acid and 10 parts of azodiisobutyronitrile was added at a constant rate over 3 hours to a refluxing mixture of 180 parts of ethyl acetate and 90 parts of butyl acetate. After refluxing for a further 2 hours the reaction product contained 50% of a graft copolymer having non-polar polymeric acid side chains and a polar polymethacrylate backbone in weight proportions of about unity. The backbone had five side chains attached thereto.

This polymeric substance was used in a dispersion polymerisation as follows.

A mixture of 1233 parts of petroleum (boiling point 70–90° C.), 19.5 parts of the above copolymer solution, 64 parts of methyl methacrylate, 1 part of methacrylic acid and 3 parts of azodiisobutyronitrile was refluxed for 20 minutes after which time 9.6 parts of a 10% solution of primary octyl mercaptan in petroleum (boiling point 70–90° C.) was added. A mixture of 1400 parts of methyl methacrylate, 28.6 parts of methacrylic acid, 3 parts of azodiisobutyronitrile and 21.6 parts of a 10% solution of primary octyl mercaptan in petroleum (boiling point 70–90° C.) was added at a constant rate over 3 hours, a mixture of 124.5 parts of the copolymer solution prepared as above and 67 parts of petroleum (boiling point 100–120° C.) also being added during the first 1½ hours. After refluxing for a further 30 minutes a fine particle size dispersion containing 55% polymer was obtained.

EXAMPLE 3

1000 parts of the methacrylic acid esters of a commercial mixture of $C_8$–$C_{10}$ aliphatic alcohols were added over 4 hours to a mixture of 700 parts butyl acetate and 300 parts ethyl acetate, heated under reflux at 101° C., and simultaneously there was added a mixture of 500 parts ethyl acetate, 10 parts thioglycollic acid and 2.5 parts 4,4'-azobis(cyanovaleric acid) dissolved in a minimum quantity of methanol. The reflux temperature fell to 89° C. by the end of this period and 1.25 parts 4,4'-azobis(cyanovaleric acid) were then added and refluxing continued for a further 8–12 hours at 89–90° C. with the periodic removal of ethyl acetate and addition of butyl acetate. The polymer thus obtained had a viscosity average molecular weight of approximately 30,000. The chains contained a terminal carboxyl group and 5.3 ml. of $$\frac{N}{10}KOH$$

were required to neutralise a 10 gm. sample of the resulting polymer solution.

Ethyl acetate was removed from the resulting solution by distillation and butyl acetate added until the distilling temperature was approximately 120° C., and a 0.3 molar excess of glycidyl methacrylate was then added to esterify the terminal carboxyl groups in the presence of 5 parts N,N'-dimethyl dodecyl amine as catalyst. The mixture was refluxed for 2–3 hours until 0.3 ml.

$$\frac{N}{10}KOH$$

were required to neutralise a 10 gm. sample of the mixture.

510 parts (188 parts non-volatile) of the solution of esterified polymer prepared above, 184 parts methyl methacrylate, 3.9 parts methacrylic acid, 649 parts ethyl acetate and 0.16 part 1,1'-azobis(isobutyronitrile) were mixed and heated to 88 C. and refluxed for 2 hours when a further 0.08 part of 1,1'-azobis(isobutyronitrile) was added and heating continued until after 6 hours the mixture became very viscous. On cooling the product gelled and a solids determination indicated that there had been an 84% conversion of monomer to backbone. On dilution with butyl acetate the copolymer product gave a solution which could be diluted with petroleum to give only a faint opalescence. On average five chains were attached to the backbone.

This polymeric substance was used in a dispersion polymerisation as follows:

129.3 parts (30 parts non-volatile) of the above copolymer solution, 200 parts butyl acetate, 21.3 parts methyl methacrylate, 0.33 part methacrylic acid and 1.0 part 1,1'-azobis(isobutyronitrile) were mixed and 316 parts of petroleum (boiling point 70–90° C.) was added with stirring to give a faintly opalescent solution. The solution was heated to 76° C. on a steam bath and maintained under reflux at this temperature for 20 minutes. During this time the solution whitened appreciably, indicating the formation of a fine particle dispersion. 3.2 parts of a 10% solution of primary octyl mercaptan in petroleum (boiling point 70–90° C.) were added and to the returning condensate was added 432 parts methyl methacrylate, 8.8 parts methacrylic acid, 6.7 parts of a 10% solution of primary octyl mercaptan in petroleum, 0.93 part 1,1′-azobis(isobutyronitrile) over a period of 3 hours. When the addition was completed the mixture was heated for a further half an hour to complete the reaction. The final product was a slightly viscous dispersion of 44% solids having particle size 0.2–0.3. In this dispersion the backbone of the polymeric substance was associated with the disperse particles and the side chains were solvated by the liquid.

EXAMPLE 4

To a refluxing mixture of 52 parts butyl acetate and 105 parts ethyl acetate was added over 3 hours a mixture of:

|  | Parts |
|---|---|
| Methyl methacrylate | 65.36 |
| Methacrylic acid | 1.34 |
| Azodiisobutyronitrile | 4.44 |
| Macro-monomer solution as prepared in Example 2 | 516.00 |

The product was a solution of a copolymer having a backbone of poly(methyl methacrylate/methacrylic acid) of molecular weight about 6,000 having on average about 16 side chains of poly(12-OH-stearic acid) attached thereto.

EXAMPLE 5

A mixture of:

|  | Parts |
|---|---|
| Poly(12-OH-stearic acid) (mol. wt. 1500–95% solids) | 2,500.0 |
| Vinyl acetate | 774.0 |
| Copper butyl phthalate | 0.5 |
| Mercuric acetate | 14.0 |
| Concentrated sulphuric acid | 3.6 | was heated at 30° C. for 144 hours to interesterify the vinyl acetate with a terminal carboxyl group on the polymer chain and so attach to the polymer chain a terminal vinyl group. The resulting crude macro-monomer solution was treated with activated alumina to reduce the acid content to 10% of its original value and excess vinyl acetate was removed by vacuum distillation.

A mixture of:

|  | Parts |
|---|---|
| Macro-monomer solution (91% solids) | 110 |
| Vinyl acetate | 98 |
| Acrylic acid | 2 |
| Azodiisobutyronitrile | 5 | was added over a period of four hours to a refluxing mixture of:

|  | Parts |
|---|---|
| Butyl acetate | 80 |
| Ethyl acetate | 120 |

Heating was continued for a further two hours. An additional 1.25 parts of azodiisobutyronitrile was added and heating continued for a further two hours, this procedure being repeated until substantially all the monomer had been converted. The product was a solution of a copolymer comprising a polyvinyl acetate backbone having about 10 poly(12-OH-stearic acid) side chains attached thereto.

EXAMPLE 6

A carboxyl-terminated poly(methyl methacrylate) of molecular weight about 6,000 was made by the process described in the first part of Example 3, using four times the proportion of thioglycollic acid and 4,4′-azobis(cyanopaleric acid). The carboxyl groups were esterified as described in Example 3 and the resulting macro-monomer was copolymerised with vinyl pyrrolidone in a weight ratio of 2:1, 1% of azodiisobutyronitrile by weight of monomer being used to produce a backbone molecular weight of about 30,000. The average number of side chains attached was about 10.

This polymeric substance can be used as a stabiliser in ester solvent which solvates the side chains but not the backbone.

EXAMPLE 7

A macro-monomer as described in Example 6 was copolymerised with di-methyl aminoethyl methacrylate in a weight proportion of 1:1, 1% of azodiisobutyronitrile by weight of monomer being used to produce a backbone molecular weight of about 30,000. The average number of side chains attached was about 5.

This polymeric substance can be used as a stabiliser in ester solvents which solvate the side chains but not the backbone.

We claim:

1. A process for producing a dispersion of polymer particles in an organic liquid in which the polymer is insoluble which comprises
polymerizing a first polymerizable material consisting of at least one ethylenically unsaturated monomer in said organic liquid in the presence in said organic liquid of a preformed dispersion stabilizer,
said dispersion stabilizer being a copolymer which is the product of copolymerizing in solution (i) a chain-like terminally monoethylenically unsaturated macro-monomer of molecular weight at least 500 and which is soluble in said organic liquid and (ii) a second polymerizable material consisting of at least one ethylenically unsaturated monomer, said copolymer having on average at least five units of polymerized macro-monomer per molecule and a backbone of units of polymerized second polymerizable material, said backbone being not solvatable in said organic liquid such that a polymer of said second polymerizable material is insoluble in said organic liquid, and the weight ratio of macro-monomer to backbone in said copolymer being from 0.5:1 to 5:1.

2. A process as set forth in claim 1 in which said weight ratio is from 0.5:1 to 2:1.

3. A process as set forth in claim 1 in which said weight ratio is from 2:1 to 5:1 and the molecular weight of said macro-monomer is not greater than 2500.

4. A process as set forth in claim 1 in which said copolymer has on average 8 to 15 macro-monomer units per molecule.

5. A dispersion produced by the process of claim 1.

References Cited

UNITED STATES PATENTS

| 3,232,903 | 2/1966 | Schmidle et al. | 260—33.6 |
| 3,235,626 | 2/1966 | Waack | 260—885 |
| 3,244,772 | 4/1966 | Von Bonin et al. | 260—861 |
| 3,277,157 | 10/1966 | Stewart et al. | 252—56 |
| 3,301,805 | 1/1967 | Kahrs et al. | 260—875 |
| 3,390,206 | 6/1968 | Thompson et al. | 260—885 |

FOREIGN PATENTS 941,305 11/1963 Great Britain.

SAMUEL H. BLECH, Primary Examiner

H. ROBERTS, Assistant Examiner

U.S. Cl. X.R.

260—875, 885, 878, 881, 886, 879, 884, 23, 33.6, 32.8, 33.4, 34.2, 29.6